United States Patent
Chakraborty et al.

[11] Patent Number: 5,181,845
[45] Date of Patent: Jan. 26, 1993

[54] ARRANGEMENT WITH PROTECTIVE EFFECTIVENESS AGAINST THE DEPOSITION OF LOW-MELTING GREASES OF HIGH VISCOSITY WHICH ARE CARRIED ALONG IN STEAM AT THE REMOVAL AND IGNITION OF HYDROGEN IN A GAS MIXTURE CONTAINING HYDROGEN, OXYGEN AND STEAM

[75] Inventors: Amiya K. Chakraborty, Erftstadt; Jurgen Rohde, Bergisch-Gladbach; Karl-Heinz Klatt; Helmut Wenzl, both of Julich; Ralf Konrad, Sinn, all of Fed. Rep. of Germany

[73] Assignees: Forschungszentrum Julich GmbH, Julich; Gesellschaft fur Reaktorsicherheit, Cologne, both of Fed. Rep. of Germany

[21] Appl. No.: 722,928

[22] Filed: Jun. 28, 1991

[30] Foreign Application Priority Data
Jul. 11, 1990 [DE] Fed. Rep. of Germany ....... 4022132

[51] Int. Cl.$^5$ ................................................ F23D 3/40
[52] U.S. Cl. .......................................... 431/7; 431/268; 431/328
[58] Field of Search ............... 431/326, 327, 147, 328, 431/7, 268, 329, 267; 110/203, 210, 211; 422/177

[56] References Cited
U.S. PATENT DOCUMENTS 3,380,810  4/1968  Hamblin ........................... 431/328
4,054,417  10/1977  Rosebrock ....................... 110/203
4,054,418  10/1977  Miller .............................. 110/203

FOREIGN PATENT DOCUMENTS
4003833  7/1991  Fed. Rep. of Germany.

Primary Examiner—James C. Yeung
Attorney, Agent, or Firm—Scully, Scott, Murphy & Presser

[57] ABSTRACT

An arrangement for the avoidance of a deposition of a fatty substance, such as liquid lubricant or grease possessing high viscosity which is carried along with steam during a combustion of hydrogen from a gas mixture containing hydrogen, oxygen and steam, through the intermediary of catalytic igniters.

3 Claims, 4 Drawing Sheets

5,181,845

ARRANGEMENT WITH PROTECTIVE EFFECTIVENESS AGAINST THE DEPOSITION OF LOW-MELTING GREASES OF HIGH VISCOSITY WHICH ARE CARRIED ALONG IN STEAM AT THE REMOVAL AND IGNITION OF HYDROGEN IN A GAS MIXTURE CONTAINING HYDROGEN, OXYGEN AND STEAM

BACKGROUND OF THE INVENTION

1. Field of the Invention

The present invention relates to an arrangement for the avoidance of a deposition of a fatty substance, such as liquid grease or lubricant possessing a high viscosity which is carried along with steam during a combustion of hydrogen from a gas mixture containing hydrogen, oxygen and steam, through the intermediary of catalytic igniters.

2. Discussion of the Prior Art

An arrangement of this type has become known from the disclosure of German Patent Publication 40 03 833.5. As is extensively described in this printed publication, the problem of eliminating or removing hydrogen from a gas mixture, especially in the case of accidents with a thermal nuclear core destruction in light-water reactor installations (core melt-down), is generally encountered in that hydrogen escapes into the oxygen-containing atmosphere of the safety containment and, in consequence thereof, there is produced a danger of explosion.

The released hydrogen, in accordance with the local concentration, the turbulence and the geometric conditions within the safety containment, can combust in the form of a deflagration or detonation. As a result thereof, the local as well as also the global elimination or removal of the hydrogen in an accident situation with nuclear core melt-down is of the utmost interest in consideration of the safety technology.

In order to reduce the local hydrogen concentration in the safety containment, the employment of igniters is taken into consideration. Through a controlled, early ignition and combustion, the hydrogen content should be restricted to within the spatial confines of the safety containment.

Primarily, taken into consideration are two types of igniters with regard to their utilization in the safety enclosure or; in essence, safety containment:

1) spark igniter and
2) catalytic $H_2$-igniter.

SUMMARY OF THE INVENTION

Accordingly, the present invention relates to an arrangement for the utilization of the catalytic igniter. The mode of operation of the catalytic igniter is given in that the heat of the reaction heat drives up the temperature of the igniter extremely high due to the catalytic oxidation, and interrelated with the temperature increase, this then leads to an ignition of the surrounding hydrogen.

Investigations of prototypes have evidenced that the release of this steam commences practically with the beginning of a nuclear core melt-down accident, whereas that of the hydrogen only first begins at a certain delay in time. Inasmuch as the steam flows through the chambers and rooms of the installation in which there are located circulating pumps, friction bearings, electric motors and the like, it carries along therewith certain quantities of lubricant and sealing grease. Hereby, it is assumed that the entire quantity of grease in the amount of 2500 l is released during a core melt-down accident from a main coolant pump. In the presence of large quantities of grease or fatty substances, carried along by and entrained in the steam, prior to the commencement of the catalytic oxidation of the hydrogen, the grease can deposit itself on the surface of the catalyst and partly or even completely prevent the later reaction. The depositing or settling of the grease, especially in the depressions between the steamed or dusted corners of the catalyst material, presents a great problem to the commencement of the catalytic reaction.

At the presence of large quantities of steam and an intense or strong flow, the catalytic reaction takes place always more slowly. The speed of the reaction increases exponentially with the temperature. Only in the presence of an adequately high temperature on the surface of the catalyzer arrangement is there obtained an adequate convection flow in order to prevent the grease particles which are entrained in the gas mixture from depositing themselves on the surface of the catalyst. The foregoing is supported through the suitably high temperature, and with the formation of steam on the surface of the catalytic igniter. However, as long as during the initial phase the temperature of the catalytic igniter is still not sufficiently high, the greases and aerosols which are mixed into the steam can deposit themselves on the surface and thereby reduce the effective catalytic surface, and significantly adversely influence the temperature increase through the catalytic action.

As a large-scaled experiment there was carried out an investigation with a PdNiCu coated catalyst.

An analysis of the measured results obtained from the catalyst experiment indicated that present on the catalyst surface there was present a large quantity of white deposits. In this experiment catalyst plates were exposed during the heating phase to a saturated steam-air atmosphere for a period of 21 hours. The analysis of the sampled water from the settled steam indicated that this water contained 700 mg of carbon per liter. Inasmuch as the spottily present white deposition could not, in any manner, by itself alone block the catalytic reaction, there were carried out on a laboratory scale large numbers of experiments with the grease-containing steam. Hereby, there was obtained the result that even the slightest proportion of 0.05g of the grease/liter of steam would prevent the catalytic reaction. Upon a cleaning of the catalyst plates after the already carried-out experiments under a grease-containing steam atmosphere, the catalyst plates evidenced trouble-free functions.

In order to prevent the deposition or settling of the grease from the grease-containing steam mixture on the catalyst surface, there were investigated measures against the deposition on a laboratory scale. Thereby, the experiments with catalyzation were carried out in the grease-containing steam atmosphere with an encompassing of the probes with the so-called HEPA (High-Efficiency Particulate Air). Also the experiments with HEPA filters directly contacting the surface of such sheet metal or plate catalysts did not evidence any influence over the course of the catalytic action. Inasmuch as the employed greases convert into a gaseous mixture at temperatures of below 160° C., the experiments with a grease-containing steam atmosphere above this temperature evidenced only slight influences even without the utilization of the filter.

These filters distinguish themselves to a particularly high separating efficiency for aerosols and greases, and simultaneously possess a high permeability for air, steam and hydrogen. Additionally, these filters also evidence such properties as a temperature stability at up to about 560° C. and a non-inflammability.

Accordingly, it is an object of the present invention to so configure a protective arrangement, that a deposition or settling of grease-containing steam emulsions on the surface of the catalytic igniters is extensively prevented and, as a result thereof, the igniting temperature which is necessary in order to achieve high reaction speed is rapidly reached within the arrangement. Upon the reaching of sufficiently high temperatures on the surface of the catalytic igniters, there is obtained an adequate convection flow in order to be able to prevent grease particles which are entrained in the gas mixture from depositing themselves on the surface of the catalytic igniters. Additionally, through the encountered high temperature of the igniters, the grease particles which are carried along in liquid form undergo a transition into a vaporous condition, and no longer influence the catalytic reactions. This object is inventively achieved in that a protective arrangement which encompasses the catalytic igniter, encloses the catalytic igniter up to an initiation of the ignition and protects the surface of the catalysts against contamination and against the deposition or settling thereon of grease particles.

BRIEF DESCRIPTION OF THE DRAWINGS

Advantageous modifications and further features of the invention can now be more readily ascertained from the following detailed description as set forth hereinbelow, taken in conjunction with the accompanying drawings; in which.

DETAILED DESCRIPTION

The protective arrangement contemplated pursuant to the invention with a filter envelopment, during an initial phase in the catalytic reaction of the catalytic igniters, retards the unhindered access of grease particles to the surface of the catalyzer arrangement. When, in this manner, there is achieved within a relatively short period of time an adequate temperature for the ignition, the filter envelopment combusts upon the ignition and is carried along as ashes by the pressure wave. For the subsequent ignition through the catalytic heating, the problem of a deposition or settling of grease particles is no longer encountered, since:

(1) the catalyst has reached a sufficiently high temperature for the spontaneous catalytic reaction;

(2) through the formation of steam on the surface of the catalytic igniters and the therewith related convective flow, any depositing or settling is rendered difficult;

(3) the sufficiently high temperature causes the grease which is carried along in liquid form to be converted into steam.

Particular exemplary embodiments of the invention are hereinbelow more closely elucidated on the basis of the drawings and plotted reaction courses, disclosed as follows:

EXAMPLE 1

Figure 1:
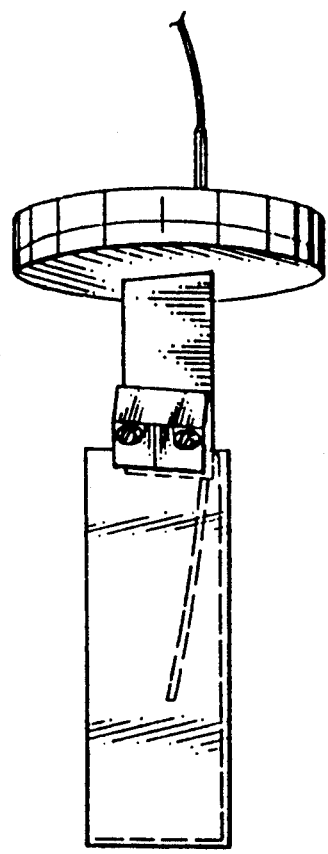
FIG. 1 illustrates the inventive protective arrangement with directly contacting HEPA filter.

FIG. 1 represents a catalyzer plate with the directly contacting filter. Hereby, the thermal element is not brought into direct contact with the plate but is placed upon the filter. In order to prevent the settling of the grease from the grease-containing steam mixture onto the catalyzer surface, the catalyzer is closed off by means of the contacting HEPA (High-Efficiency Particulate Air) filter. These filters, which are constituted from glass fibers, distinguish themselves in a particularly high efficiency in the separation of grease and, simultaneously, possess a high degree of permeability to air, steam and hydrogen. Moreover, these filters also exhibit such properties as a temperature stability at up to 560° C., and a non-inflammability up to that temperature.

EXAMPLE 2

Investigated was the catalytic effectiveness and the therewith connected temperature increase of a catalyst in a grease-containing atmosphere. The investigation of the catalyzing ability was undertaken in a reaction chamber into which there was introduced a blendable gas mixture which conforms to the realistic conditions encountered with core melt-down accidents. In the reaction chamber, the catalyst represented in the exemplary embodiment was fastened to an upper flange which protrudes into the spherical reaction chamber. In order to be conservative with respect to the influence of the grease, the experiments were overwhelmingly carried out with such greases which were characterized by a lower congealing point. As a result, there was afforded a good dispersion within the steam mixture.

Figure 2:
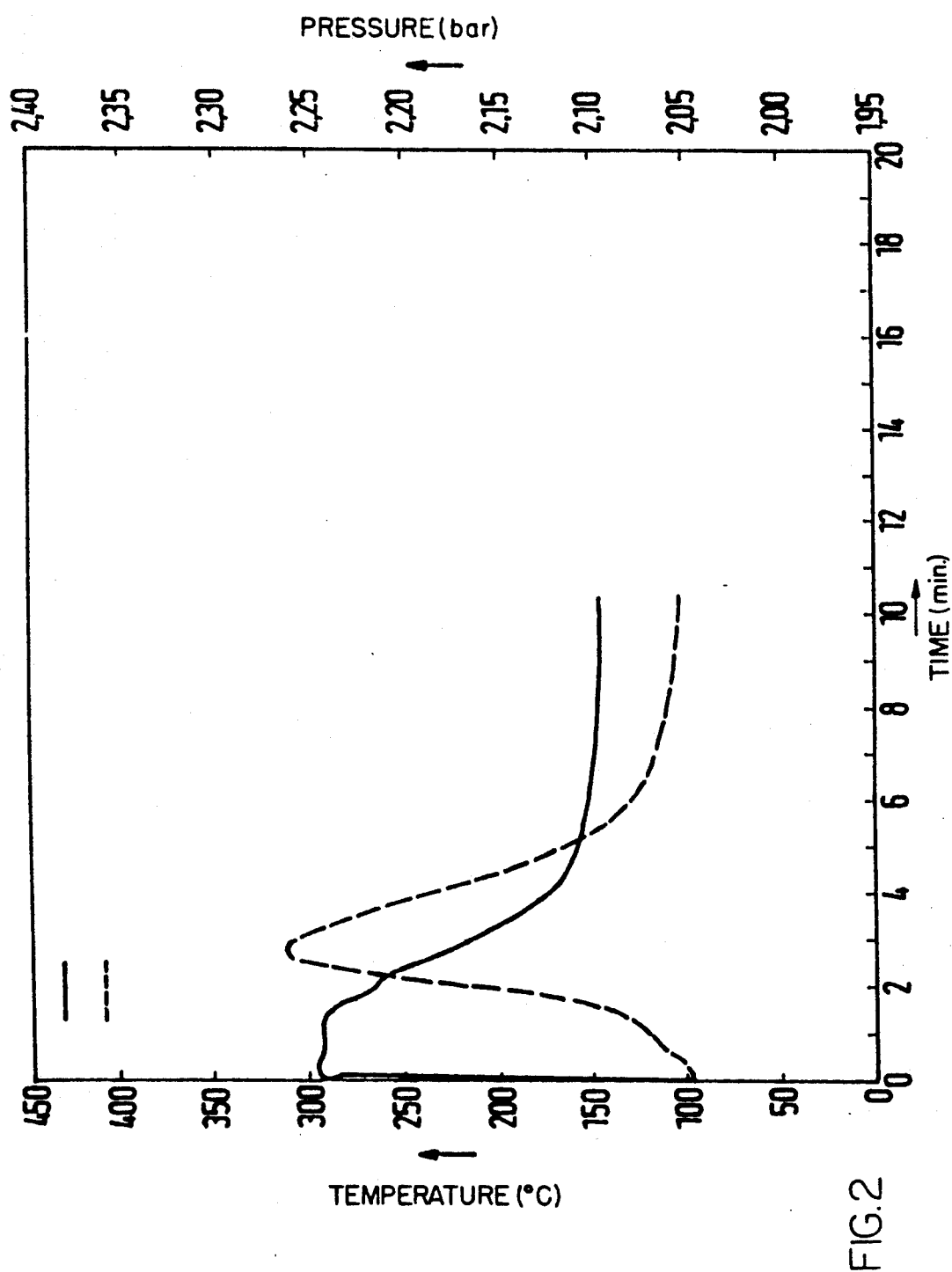
FIG. 2 through 4 illustrate plots of the temperature and pressure courses for, respectively, the catalyst plate and reaction chamber as a result of the catalytic oxidation of $H_2$ after an exposure of the catalyst plate in a grease-containing saturated steam atmosphere.

FIG. 2 represents a plot of the temperature and pressure courses as a consequence of the catalytic oxidation of the $H_2$ after exposure of the catalyst plate to a grease-containing saturated steam atmosphere with 0.5 g ESSO ESTAN 2 for two hours at 100° C. The results of the above-mentioned experiment pointed to the fact that the catalyzing courses in a grease-containing saturated steam atmosphere could take place in the absence of encountering any problems even after a lengthier exposure when by means of a blocking, the depositing of the grease on the surface of the catalysts could be avoided due to the HEPA filter.

Numerous experiments were carried out without any envelopment of the filter with the greases mixed into steam, such as ESSO ESTAN 2 and Shell Multi-purpose grease or lubricant. Thereby, there could not be determined any catalytic effect connected with the temperature increase even after a repeated introduction of the hydrogen. In contrast therewith, after the cleaning of the reaction chamber and the plates with acetone, benzene and propanol, the same plates exhibited an immediate and good catalyzing ability.

EXAMPLE 3

The presence of the grease in the environment influences the catalyzing ability only for so long until the carried-along grease is dispersed in the steam atmosphere and can deposit itself on the plate. When the temperature of the catalyst is sufficiently high so that a vaporization of the grease which is to be settled can readily take place upon contacting the catalyst, the catalytic reaction will then take place in an unhindered manner.

In order to be able to determine the conversion temperature, there was carried out an experiment with 5 cm$^2$ of sump or pool water and 0.5 g of grease of the type ESSO ESTAN 2. Thereby, the reaction chamber was continuously heated up with the enclosed air. After the vaporization of the water above 100° C., there was initially apportioned a period of time of 1.5 hours for the exposure of the catalyst plate in the grease-containing saturated steam atmosphere. Prior to the commencement of the exposure, there were introduced 0.2 bar of hydrogen.

Figure 3:
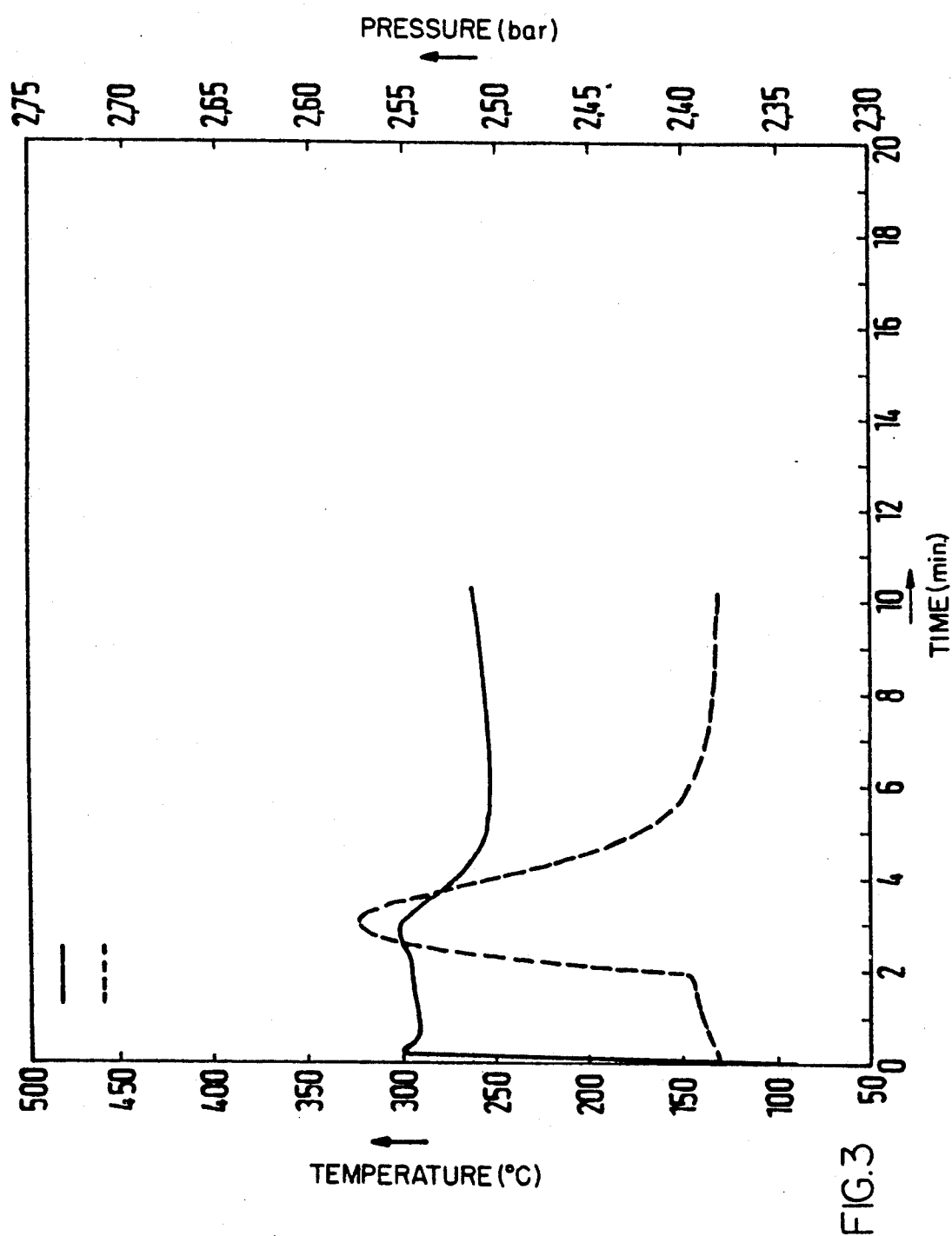

FIG. 3 represents a plot of the temperature and pressure courses of the catalytic reaction. Only first upon reaching a temperature of 130° C. was there registered a slow temperature increase at the surface of the catalyst plate. When the temperature reached 145° C., there then began the spontaneous catalytic reaction. From the reaction there can be ascertained that the transitional temperature for the commencement of the catalytic reaction lies at about 145° after an exposure to a grease-containing saturated steam atmosphere with the grease or lubricant ESSO ESTAN 2.

EXAMPLE 4

In order to confirm the thesis that above the transitional temperature at which the grease is present in a vaporized condition and cannot deposit itself on the catalyst plate, the catalytic reaction takes place in an unhindered manner, there was carried out an experiment at 160° C. Hereby, present 0.3 g of ESSO ESTAN 2 and Shell Multi-purpose grease or lubricant were heated at 4 cm$^3$ of sump or pool water. Only first after an exposure of the plate in a grease-containing saturated steam atmosphere at 160° C. and for a period of 1.5 hours were there introduced 0.22 bar of hydrogen into the chamber. Hereby, in the chamber there reigned an atmospheric condition of 1.3 bar air, 1.45 bar steam, and 0.22 bar hydrogen.

Figure 4:
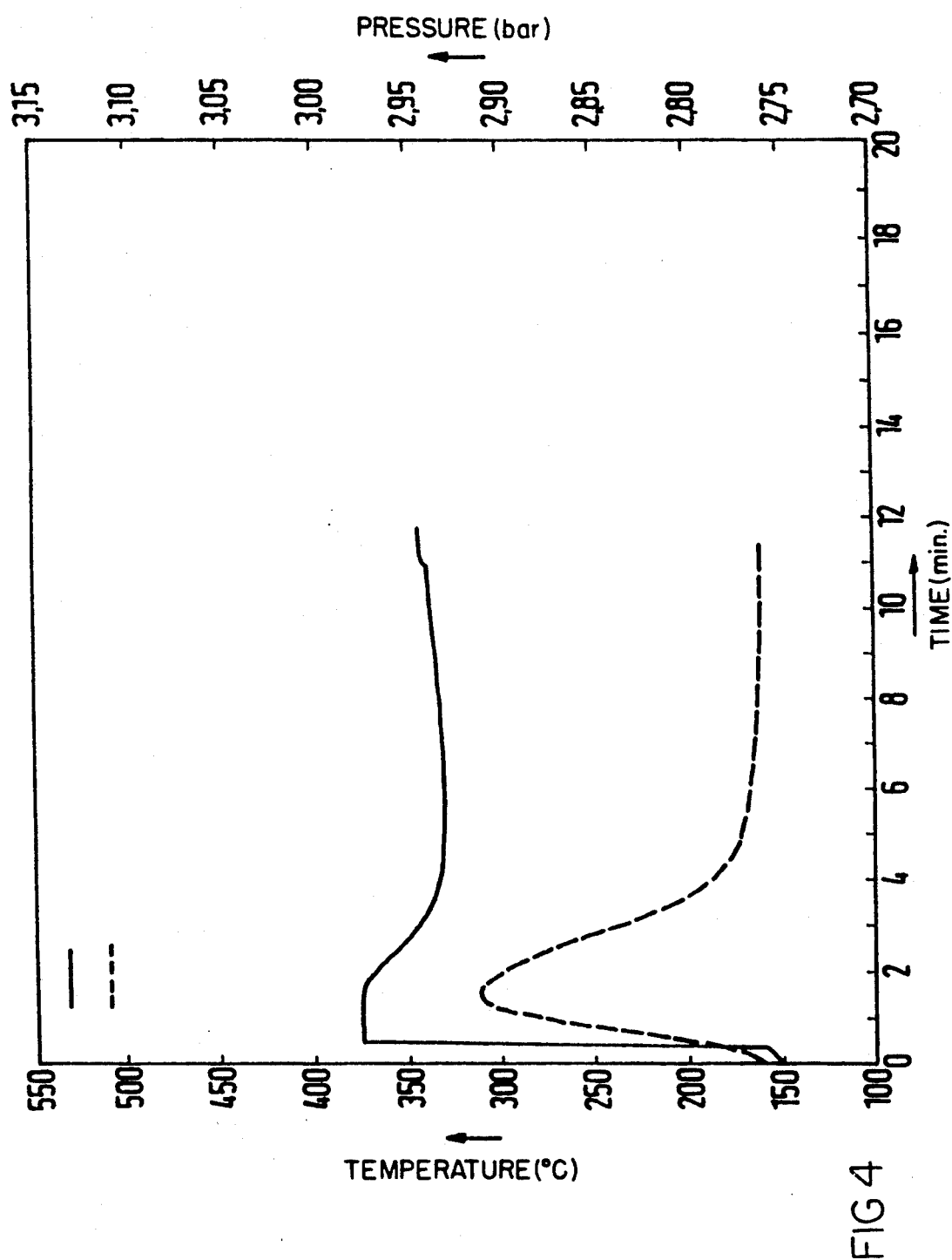

FIG. 4 represents the plot of the temperature and pressure courses after the introduction of the hydrogen in consequence of the catalytic oxidation. From this figure there can be ascertained that the reaction began without any kind of delay and terminated within 4 minutes.

Under the same conditions there were carried out a few experiments with a different grease content as well as with the typical types of greases or lubricants. From the pressure and temperature courses there could be unambiguously ascertained that above a temperature of 160° C., the greases or lubricants were present in a vaporous form and permitted an unhindered catalytic reaction. Additionally, the courses indicated that for an expected grease-containing saturated steam atmosphere, the catalyst plates must be protected from the depositing of grease up to the beginning of an accelerated catalytic reaction.

What is claimed is:

1. A process for preventing the deposition of liquid grease or lubricant particles of high viscosity onto the surface of a catalytic igniter wherein said particles are carried along to the igniter with steam during the combustion of hydrogen from a gas mixture containing hydrogen, oxygen and steam, which comprises:
   (a) enveloping a catalytic igniter with a protective means to shield said catalytic igniter until the initiation of ignition so as to protect the surface of the catalyst against contamination and against the depositing of grease or lubricant particles, said protective means comprising a thin filter material which is permeable to gas, substantially impermeable to grease and lubricant particles and convertible into light ashes during combustion initiated by said catalytic igniter, and
   (b) igniting said catalytic igniter in the presence of a combustion gaseous mixture causing (i) said filter material to be converted into light ashes through combustion, (ii) any grease or lubricant particles present to be converted into soot through combustion and (iii) said light ashes and soot to be blown away from said igniter by the pressure differential resulting from the ignition of said combustible gaseous mixture.

2. A process according to claim 1, including the following step, subsequent to said ignition and before a subsequent ignition:
   (c) heating said catalytic igniter under conditions effective to prevent the deposition of grease or lubricant particles on the surface of said catalytic igniter.

3. An arrangement for avoiding the depositing on a catalytic igniter of liquid greases or lubricant of high viscosity carried along by steam during combustion of hydrogen from a gas mixture containing hydrogen, oxygen and steam comprising:
   at least one catalytic igniter; and
   a protective means enveloping said catalytic igniter and shielding said catalytic igniter until the initiation of ignition so as to protect the surface of the catalyst against contamination and against the depositing of grease or lubricant particles, said protective means comprising a thin filter material which is permeable to gas, substantially impermeable to grease and lubricant particles, and convertible into light ashes during combustion initiated by said catalytic igniter.

* * * * *